United States Patent Office 3,246,033
Patented Apr. 12, 1966

3,246,033
PROCESS FOR THE PREPARATION OF PHOSPHORUS-CONTAINING ISOCYANATES
Guenter K. Weisse, Hamden, and Robert M. Thomas, Orange, Conn., assignors to Olin Mathieson Chemical Corporation, a corporation of Virginia
No Drawing. Filed Jan. 26, 1961, Ser. No. 84,978
7 Claims. (Cl. 260—545)

The present invention relates to a process for the preparation of phosphorus-containing isocyanates. More particularly, the present invention resides in a process for the preparation of phosphorus-containing isocyanates in which isocyanate radicals are attached directly to phosphorus by the reaction between isocyanic acid and a phosphorus halide.

Phosphorus-containing isocyanates are conventionally prepared by reacting silver isocyanate or an alkali metal cyanate with the corresponding phosphorus chloride. These methods are subject to numerous disadvantages. The silver isocyanate method is expensive, especially due to the high cost of the silver reactant. In addition, the silver isocyanate method prepares the product in a heterogeneous reaction mixture which must be continually agitated during the reaction. The silver isocyanate method is subject to the further disadvantage that the reaction itself is quite slow and normally high reaction temperatures and long reaction times are required in order to obtain good yields. The alkali metal cyanate method is subject to the significant disadvantage of low yields, even when long reaction times are employed.

It is, therefore, an object of the present invention to provide an improved process for the preparation of phosphorus-containing isocyanates.

It is an additional object of this invention to prepare phosphorus-containing isocyanates inexpensively and expeditiously.

It is a further object of the present invention to prepare phosphorus-containing isocyanates utilizing a homogeneous reaction mixture which does not require continuous agitation during the reaction.

It is a particular object of the present invention to provide a process which will prepare phosphorus-containing isocyanates in high yields, even at ambient reaction temperatures.

Further objects and advantages of the present invention will appear hereinafter.

The foregoing objects and advantages of the present invention are accomplished by the process of the present invention. The phosphorus-containing isocyanates which are prepared have the following structural formula:

$$R_yP(NCO)_z$$

wherein each R is independently selected from the group consisting of a monovalent hydrocarbon radical, a monovalent alkoxy radical, and a monovalent aryloxy radical, $y$ is an integer from 0 to 2, inclusive, $z$ is an integer from 1 to 3, inclusive, and the sum of $y$ plus $z$ is equal to three. The process of the present invention comprises reacting together in the liquid phase, at a temperature of between —85 and 150° C., isocyanic acid and a phosphorus-containing halide having the following structural formula:

$$R_yPX_z$$

wherein X is halogen and R, $y$, and $z$ are as defined above, in the presence of a nitrogen-containing compound selected from the group consisting of compounds having the following structural formulas, and mixtures thereof:

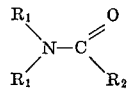

wherein each $R_1$ is independently a monovalent hydrocarbon radical, and $R_2$ is selected from the group consisting of a monovalent hydrocarbon radical and hydrogen, and each $R_3$, $R_4$ and $R_5$ is independently selected from the group consisting of a monovalent hydrocarbon radical and hydrogen, at least one, but not more than two, of $R_3$, $R_4$ and $R_5$ being a monovalent aromatic radical, and not more than one of $R_3$, $R_4$ and $R_5$ being hydrogen, and recovering the resulting product. The findings of the present invention are unexpected and surprising, especially in view of the fact that when phosphorus trichloride and isocyanic acid are the sole reactants, in the absence of the aforementioned nitrogen-containing compounds, no isocyanate is formed.

Isocyanic acid, frequently referred to in the art as cyanic acid, is known in the art and may be prepared by conventional procedures, such as by pyrolysis of cyanuric acid and condensation of the vapors.

The phosphorus-containing halides which may be employed are those which have the following structural formula.

$$R_yPX_z$$

wherein R, X, $y$ and $z$ are as defined above. Each of the R radicals should preferably, although not essentially, contain less than seven carbon atoms since the compounds containing these radicals are more readily available and have been found to be the most useful. The R radicals may be the same or different. Illustrative hydrocarbon, alkoxy, and aryloxy radicals are as follows: alkyl radicals, such as methyl, ethyl, propyl, isopropyl, butyl, hexyl, octyl, decyl, dodecyl, etc.; alkenyl radicals, such as ethenyl, propenyl, etc.; alkynyl radicals, such as ethynyl, propynyl, etc.; cycloalkyl radicals, such as cyclopropyl, cyclobutyl, cycloamyl, cyclohexyl, etc.; cycloalkenyl radicals, such as cyclobutenyl, cyclopentenyl, cyclohexenyl, etc.; aryl radicals, such as phenyl, anthracyl, naphthyl, etc.; aralkyl radicals, such as benzyl, phenyl-ethyl, phenyl-propyl, etc.; alkaryl radicals, such as xylyl, tolyl, ethyl-phenyl, p-butylphenyl, p-diisobutylphenyl, etc.; alkoxy radicals, such as methoxy, ethoxy, propoxy, etc.; and aryloxy radicals, such as phenoxy, p-butylphenoxy, etc. In addition the hydrocarbon, alkoxy or aryloxy group may be substituted with non-interfering substituents, such as halo (i.e., chloro, bromo, fluoro or iodo), nitro, sulfo, etc. The X substituent in the phosphorus halide is any halogen or mixtures thereof, with the preferred being chlorine.

Exemplificative phosphorus-containing halides include, but are not limited to, the following compounds: phosphorus trichloride; phosphorus tribromide; phosphorus trifluoride; phosphorus triiodide; methyldichlorophosphine; dimethylchlorophosphine; diethylchlorophosphine; ethyldichlorophosphine; di-n-butylchlorophosphine; diphenylchlorophosphine; phenyldichlorophosphine; ethyl phenylchlorophosphine; diethoxychlorophosphine; methoxydichlorophosphine; diphenoxychlorophosphine; methyl propylchlorophosphine; etc.

Isocyanic acid and the desired phosphorus halide are reacted together in the presence of the nitrogen-containing compound. The nitrogen-containing compound acts as an acceptor for the hydrogen halide evolved by the reaction between isocyanic acid and the phosphorus halide, and preferably, but not necessarily, forms an insoluble compound by reaction with the hydrogen halide. The insoluble compound precipitates from the reaction mixture and may be readily separated by numerous methods known in the art, for example, by filtration. The product may then be recovered from the filtrate by any convenient means, for example, fractional distillation or crystallization.

The nitrogen-containing compounds which may be employed in the process of the present invention are tertiary amides and tertiary amines. One or more amide or amine or mixtures thereof may be conveniently employed. The compounds which may be utilized are tertiary amides having the structural formula:

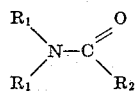

and tertiary amines having the structural formula:

wherein $R_1$, $R_2$, $R_3$, $R_4$ and $R_5$ are as defined above. Each of the radicals $R_1$, $R_2$, $R_3$, $R_4$ and $R_5$ should preferably, although not essentially, contain less than seven carbon atoms, since the compounds containing these radicals are the most readily available and have been found to give the best results; however, good results are obtainable when one or more of the radicals $R_1$, $R_2$, $R_3$, $R_4$ and $R_5$ contain seven carbon atoms or greater. The $R_1$ radicals may be the same or different. Illustrative hydrocarbon radicals representing $R_1$, $R_2$, $R_3$, $R_4$ and $R_5$ are those listed above, i.e., alkyl radicals, alkenyl radicals, alkynyl radicals, cycloalkyl radicals, cycloalkenyl radicals, aryl radicals, aralkyl radicals, and alkaryl radicals, and illustrative radicals listed thereunder. In addition, the hydrocarbon groups may be substituted with non-interfering substituents, such as an ester group or a nitro group.

The nitrogen-containing compounds which are employed must be substantially non-reactive under the conditions of the reaction, except for the reaction with the hydrogen halide. In addition they should preferably form a homogeneous reaction mixture with reactants and reaction products.

Exemplificative nitrogen-containing compounds include, but are not limited to, the following compounds: dimethyl acetamide; dimethyl formamide; diethyl acetamide; methyl ethyl acetamide; dimethyl butyramide; methyl phenyl acetamide; ethyl phenyl acetamide; methyl ethenyl acetamide; methyl benzyl acetamide; diphenyl amine; dimethyl aniline; diethyl aniline; methyl ethyl aniline; methyl phenyl aniline; ethyl phenyl aniline; phenyl naphthyl amine, etc. The preferred nitrogen-containing compounds are the lower alkyl and phenyl substituted compounds. Especially preferred are dimethyl acetamide, diphenyl amine and dimethyl aniline.

The phosphorus-containing isocyanates prepared by the process of the present invention have the following structural formula:

$$R_yP(NCO)_z$$

wherein R, y, and z are as defined above. Representative radicals for the substituent R are those listed above. The R radicals may be the same or different. Typical products include, but are not limited to, the following: triisocyanatophosphine; dimethylisocyanatophosphine; di-n-butyl isocyanatophosphine; chlorodiisocyanatophosphine; diethoxyisocyanatophosphine; methoxydiisocyanatophosphine; phenoxydiisocyanatophosphine; phenyldiisocyanatophosphine; diphenylisocyanatophosphine; 2,4-dichlorophenyldiisocyanatophosphine; 2,4-dinitrophenyldiisocyanatophosphine; methyl ethylisocyanatophosphine; etc.

All of the phosphorus-containing isocyanates prepared by the process of the present invention are colorless liquids with a boiling point higher than the corresponding chlorides. They polymerize slowly on standing and polymerize more rapidly at elevated temperatures. Highly purified products, which can be obtained by several distillations, can be stored for two weeks at room temperature without noticeable polymerization. The phosphorus-containing isocyanates prepared by the process of the present invention exhibit the characteristic isocyanate reactions, such as evolution of carbon dioxide in the presence of water, and the formation of urethanes and ureas upon reaction with alcohols and amines respectively.

The time of reaction is not critical and extended reaction times may be used, if desired. Generally, however, reaction times of up to about four hours are employed. In some cases extended reaction at elevated temperatures may result in loss of product due to polymerization. The reaction is conducted between −85 and 150° C., and preferably between −40 and 20° C., it being understood that the reaction goes faster at higher temperatures. It is an advantage of the present invention that high yields are obtained at ambient temperatures and short reaction cycles. Naturally, wide variations in either may be tolerated.

The ratio of isocyanic acid to phosphorus halide is not critical. Generally, however, the theoretical proportions, or an excess of phosphorus halide, are employed. It should be understood that molar ratios are calculated on complete displacement of halogen, e.g., one mole of $PX_3$ requires three moles of isocyanic acid and three moles of nitrogen-containing compound. The excess of phosphorus halide is desirable as it acts as a stabilizer for the isocyanic acid and isocyanate product. An excess of isocyanic acid may also be used, but may result in the formation of undesirable by-products.

The amount of nitrogen-containing compound may be varied within a wide range. Generally from 0.5 to 3.0 moles of nitrogen-containing compound per mole of isocyanic acid may be employed, and preferably from 0.8 to 1.5 moles.

Either a crude or purified isocyanic acid may be used. It is especially advantageous to introduce into the reaction mixture crude, gaseous isocyanic acid directly from the pyrolysis of cyanuric acid. Alternatively, prior to the introduction of the gaseous isocyanic acids the gas may be absorbed in an inert solvent or in one of the reactants, for example, preferably the phosphorus-containing compound, especially phosphorus trichloride.

The order of addition of the reactants is not critical, except that in some instances it is desirable to avoid direct contact between the nitrogen-containing compound and isocyanic acid as a highly exothermic reaction might result. It is preferred but not essential either to add the nitrogen-containing compound slowly to a mixture of isocyanic acid and the phosphorus halide, or to add the isocyanic acid slowly to a mixture of nitrogen-containing compound and phosphorus halide. It is especially preferred to add the crude gas slowly.

If desired, the reaction may be conducted in the presence of a solvent which is substantially inert with respect to reactants and reaction products. Typical solvents which may be employed include, for example, diethyl ether, benzene, toluene, xylene, methyl chloride, acetonitrile, etc. In addition, it is desirable, but not essential, to wash the solid hydrochloride which has been separated from the reaction mixture with any of the above solvents in order to free any occluded filtrate.

The products of the process of the present invention may be used in a wide variety of applications, for example, they are useful in the preparation of sealants and coatings. They are also useful in the preparation of polymeric resins, especially where good flame-retardance and high thermal stability is desired. They are also useful in the preparation of flame retardant cellulosic material.

The following examples will further illustrate the process of the present invention and compounds obtained thereby.

Example 1.—Preparation of triisocyanatophosphine

A 200 milliliter, three-neck flask equipped with a stirrer, reflux condenser fitted with a drying tube, thermowell, dropping funnel and external cooling bath was charged with 28.9 grams (0.21 mole) of phosphorus trichloride, 300 grams of toluene and 52.3 grams (0.60 mole) of dimethylacetamide. The mixture was cooled to −74° C. and 25.8 grams (0.60 mole) of purified isocyanic acid was added rapidly, the temperature rising to −59° C. The reaction mixture was maintained at this temperature for an additional 45 minutes. After this time the precipitated dimethylacetamide hydrochloride was filtered off under nitrogen pressure. The dimethylacetamide hydrochloride was washed with an additional 100 grams of cold −70° C. toluene. The dimethylacetamide hydrochloride was recovered in nearly the stoichiometric amount. The filtrate was distilled at reduced pressure and there was obtained 67 percent yield of triisocyanatophosphine P(NCO)$_3$ based on isocyanic acid charged. Upon redistillation, it boiled at 165 to 168° C. and had a refractive index of 1.5329 at 25° C., compared to 1.5352 in the literature. The isocyanate structure was shown by infrared analysis.

Example 2.—Preparation of triisocyanatophosphine

Example 1 was repeated, except that 0.60 mole of dimethylaniline was substituted for the dimethylacetamide. Triisocyanatophosphine was obtained in good yield.

Example 3.—Preparation of methoxydiisocyanatophosphine

A 500 milliliter flask equipped as in Example 1 was charged with 34.9 grams (0.26 mole) of methoxydichlorophosphine CH$_3$OPCl$_2$, 150 milliliters of benzene and 43.5 grams (0.5 mole) of dimethylacetamide. The mixture was cooled to 5° C. and 21.5 grams (0.5 mole) of liquid isocyanic acid was added over a period of 45 minutes. The reaction temperature was maintained between 5 and 15° C. during this period and for 35 minutes thereafter. After this time the precipitated dimethylacetamide hydrochloride was filtered off under nitrogen pressure. The filter cake was not washed with any solvent. The filtrate was distilled. After removal of solvent, 15 grams of methoxydiisocyanatophosphine CH$_3$OP(NCO)$_2$ was obtained which boiled at 30 to 35° C. at 2 millimeters mercury. This is equivalent to a yield of 41 percent. The product had a refractive index of 1.4687 at 25° C. and shows the isocyanate structure by infrared analysis.

Example 4.—Preparation of phenyldiisocyanatophosphine

A one liter flask equipped as in Example 1 was charged with 17.9 grams (0.1 mole) of phenyldichlorophosphine, 225 grams of anhydrous ether and 8.6 grams (0.2 mole) of isocyanic acid. The mixture was cooled to 3° C. and 17.4 grams (0.2 mole) of dimethylacetamide was added over a 20 minute period. The temperature was maintained between 3 and 15° C. during the addition period and for 50 minutes after. After this time the precipitated dimethylacetamide hydrochloride was filtered off under nitrogen pressure. The dimethylacetamide hydrochloride was washed with an additional 100 grams of anhydrous ether. The dimethylacetamide hydrochloride was recovered in nearly the stoichiometric amount. The filtrate was distilled at reduced pressure and there was obtained a good yield of phenyldiisocyanatophosphine C$_6$H$_5$P(NCO)$_2$. It boiled at 119 to 122° C. at 3 millimeters mercury. The isocyanate structure was shown by infrared analysis.

Example 5.—PCl$_3$ and isocyanic acid as sole reactants

Phosphorus trichloride and isocyanic acid, at various ratios, with or without solvents, such as benzene and anhydrous ether, were reacted together at temperatures from −70 to 40° C. for varying lengths of time. In no case was there any isocyanate product obtained, as indicated by infrared analysis.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A process for the preparation of phosphorus-containing isocyanates having the following structural formula:

$$R_yP(NCO)_z$$

wherein each R is independently selected from the group consisting of a monovalent hydrocarbon radical containing less than 7 carbon atoms, a monovalent lower alkoxy radical, and a monovalent phenoxy radical, y is an integer from 0 to 2, inclusive; z is an integer from 1 to 3, inclusive; and the sum of y plus z equals three, which comprises reacting together in the liquid phase, at a temperature of between −85° C. and 150° C., (a) isocyanic acid and
(b) a phosphorus-containing halide having the following structural formula:

$$R_yPX_z$$

wherein X is halogen and R, y, and z are as defined above, in the presence of
(c) a nitrogen-containing compound selected from the group consisting of compounds having the following structural formulas, and mixtures thereof:

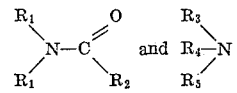

wherein each R$_1$ is independently a monovalent hydrocarbon radical containing less than 15 carbon atoms, and R$_2$ is selected from the group consisting of a monovalent hydrocarbon radical containing less than 15 carbon atoms and hydrogen, and each R$_3$, R$_4$ and R$_5$ is independently selected from the group consisting of a monovalent hydrocarbon radical containing less than 15 carbon atoms and hydrogen, at least one, but not more than two, of R$_3$, R$_4$, and R$_5$ being a monovalent aromatic radical selected from the group consisting of phenyl, naphthyl and anthracyl, and not more than one of R$_3$, R$_4$, and R$_5$ being hydrogen, and recovering the resultant product.

2. A process according to claim 1 wherein the reaction is conducted in the presence of an inert solvent.

3. A process according to claim 1 wherein said nitrogen-containing compound is dimethylacetamide.

4. A process according to claim 1 wherein said nitrogen-containing compound is dimethylaniline.

5. A process according to claim 1 wherein triisocyanatophosphine is recovered as product of the process.

6. A process according to claim 1 wherein phenyldiisocyanatophosphine is recovered as product of the process.

7. A method for producing a compound of the formula $$R_{(3-x)}-P-(NCO)_x$$

wherein R is a member of the group consisting of lower alkyl and lower alkoxy and X is an integer from 1 to 3, which comprises reacting a phosphorus halide of the formula R$_{3-x}$—P(halide)$_x$ with isocyanic acid in the presence of a tertiary amine and an inert solvent.

References Cited by the Examiner

UNITED STATES PATENTS 2,835,652   5/1958   Haven _____ 260—461.306

(Other references on following page)

OTHER REFERENCES

Van Wazer: Phosphorus and Its Compounds, vol 1, 1958, pp. 259 and 260, Interscience Publishers, Inc., New York, N.Y.

Kosolapoff: Organo Phosphorus Compounds, 1950, p. 216, John Wiley and Sons, Inc., New York, N.Y.

CHARLES B. PARKER, *Primary Examiner.*

ABRAHAM WINKELSTEIN, MORRIS LIEBMAN, IRVING MARCUS, WALTER A. MODANCE,
*Examiners.*

D. D. HORWITZ, J. R. GENTRY, F. M. SIKORA,
*Assistant Examiners.*